Oct. 21, 1958  E. F. RIESING  2,857,179
BEARING SEAL
Filed July 1, 1955  2 Sheets-Sheet 1
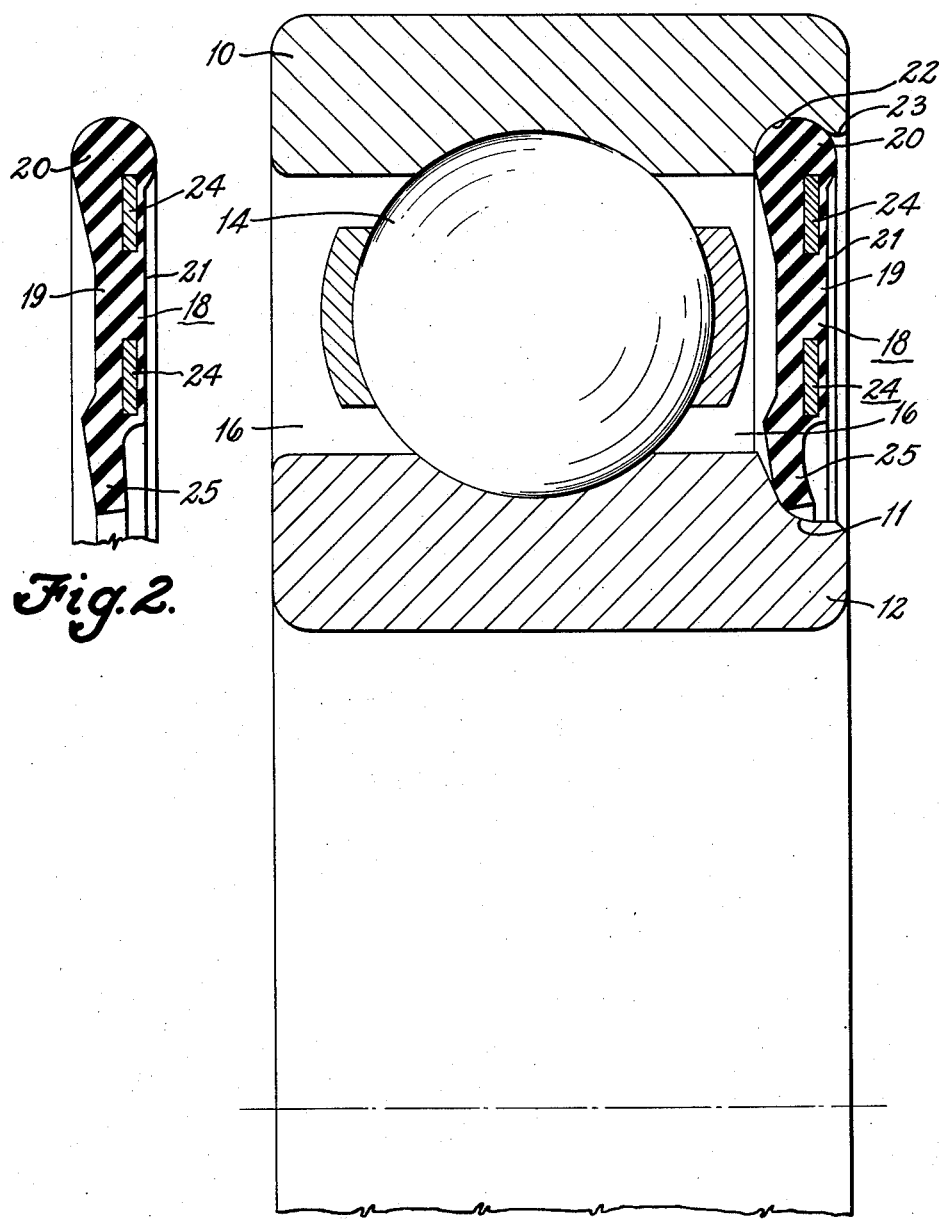
Fig.2.
Fig.1.
INVENTOR.
ELLWOOD F. RIESING
BY
ATTORNEY Oct. 21, 1958 E. F. RIESING 2,857,179
BEARING SEAL
Filed July 1, 1955 2 Sheets-Sheet 2

INVENTOR.
ELLWOOD F. RIESING
BY
ATTORNEY

United States Patent Office 2,857,179
Patented Oct. 21, 1958

2,857,179
BEARING SEAL

Ellwood F. Riesing, Dayton, Ohio, assignor to General Motors Corporation, Detroit, Mich., a corporation of Delaware Application July 1, 1955, Serial No. 519,488

5 Claims. (Cl. 286—5)

This invention relates to fluid seals for sealing the space between a pair of relatively rotatable members and particularly to a demountable seal for maintaining lubricant within an anti-friction bearing and for preventing the ingress of dirt and other deleterious material therein.

An oil seal is generally installed at the end of a lubricant chamber between anti-friction bearing race rings for retaining lubricant within the bearing. Such bearings are frequently subjected to high operating temperatures or to extended periods of overload which results in oxidation and hardening of the lubricant resulting in insufficient lubrication and failure of the bearing. To prevent these consequences, it is necessary to periodically remove the bearing seal for the purpose of cleaning out the bearing and replacing the lubricant. It is highly desirable, therefore, to provide a bearing seal which provides an effective seal for preventing the egress of lubricant from and the ingress of dirt to the bearing and which may be readily inserted or removed from the bearing assembly without damage to the seal or the bearing assembly in which it is mounted.

It is an object of this invention to provide a unitary oil seal for closing an annular space between relatively rotatable members in the form of a substantially flat elastomeric annulus having embedded therein a flat annular resilient reinforcing member whereby the seal is supported against radial deformation when in operating position between relatively rotatable members, the seal may be readily snapped into and out of operating position due to the radially compressible nature of the reinforcing member and the seal may be advantageously used in self-aligning bearing installations due to axial flexibility of the reinforcing member.

It is another object of this invention to provide a demountable seal installed between a pair of anti-friction bearing race rings, wherein the seal is in the form of an elastomeric annulus having embedded therein a resilient reinforcing member whereby the seal is in resilient, deformable sealing engagement with at least one of the bearing race rings.

Further objects and advantages of the present invention will be apparent from the following description, reference being had to the accompanying drawings wherein preferred embodiments of the present invention are clearly shown.

In the drawings:

Figure 1 is a cross sectional view of a portion of an anti-friction bearing showing a demountable seal in operating position.

Figure 2 is a cross sectional view of a portion of a demountable seal in a free state.

Figure 3:
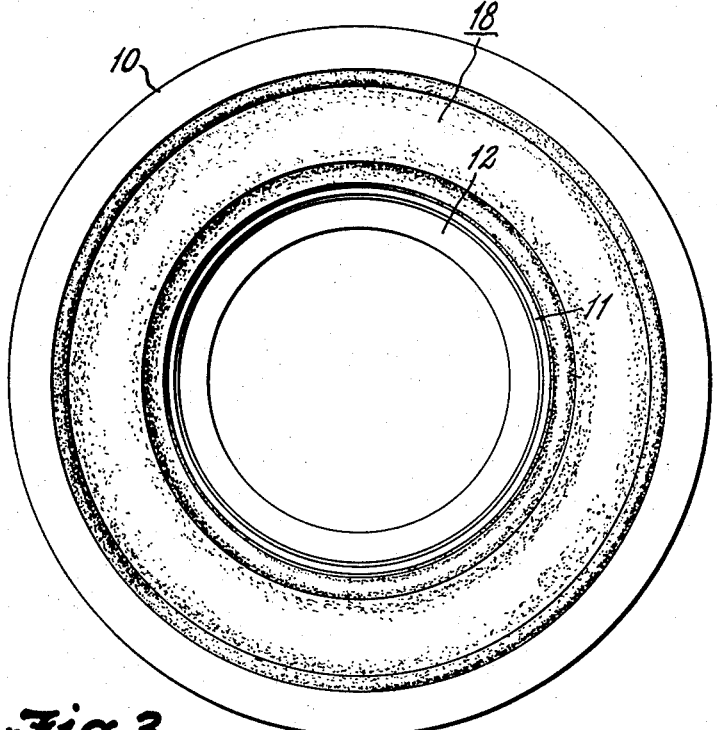
Figure 3 is a side elevational view of a ball bearing having an oil seal positioned therein.
Figure 4:
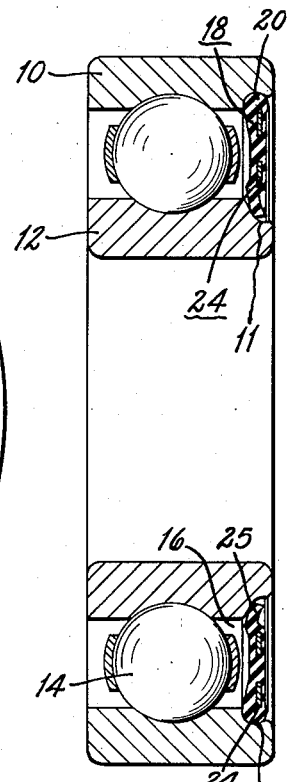
Figure 4 is a cross sectional side view of the view shown in Figure 3.

Referring to Figure 1, an outer bearing race 10 and an inner bearing race 12 have interposed therebetween anti-friction bearings 14 and form an annular lubricant chamber 16 which is closed by seal member 18 to prevent egress of lubricant therefrom and the ingress of dirt and other deleterious material thereto.

The seal 18 consists of a substantially flat annular elastomeric portion 19 having an enlarged bead-like peripheral portion 20 integrally attached thereto and adapted for snapping into an internal groove 22, formed integrally in the outer bearing race 10. A sealing lip portion 25 is integrally attached to the inner axial side of annular portion 19 which extends in the direction of inner bearing race 12 so as to wipingly engage curved portion 11 of bearing race 10. The sealing lip portion 25 has a lesser axial dimension than the balance of the seal so as to provide it with greater flexibility. The outer diameter of bead portion 20 is somewhat greater than the diameter of groove 22 so that it is placed under compression when snapped into groove 22 of the outer bearing race to provide a resilient and sealing engagement of the parts. Sealing lip 25 extends radially in the direction of inner bearing race 12 and somewhat axially outwardly of bearing 14 and it has an inner diameter less than the portion of the inner race diameter which it engages, so that when the seal is snapped into position between the bearing races, sealing lip 25 is slightly distorted outwardly of the bearing as shown in Figure 1 so as to provide an effective running seal between the parts.

The annular seal body 19 is further provided with an annular resilient radially compressible and axially distortable reinforcing member 24 molded and embedded therein. As may be noted with reference to Figures 1 and 2, the reinforcing member 24 is positioned within the seal body 19 inwardly of its atmosphere side 21 so as to support the bead portion 20 of the seal against groove 22 at a point just inwardly of the lip 23 of groove 22 whereby the resilient reinforcing member tends to hold the seal locked in place by reason of the compressive forces between the lip portion 23 of the groove 22 and the radially compressible reinforcing member 24 being directed inwardly of the seal and the bearing assembly. Further, since this force is directed inwardly of the radial plane of the seal by a relatively small angle, the reinforcing member 24 need be compressed radially a relatively small amount to remove the seal from groove 22.

The reinforcing member 24 is preferably positioned axially spaced from the radial plane of sealing lip 25 so as to permit sealing lip 25 to retain its flexibility when installed and not be unduly subject to compressive forces between the reinforcing member 24 and inner bearing race 12. However, when the seal is snapped into place within groove 22, reinforcing member 24 is slightly compressed radially so as to urge seal lip 25 radially into sealing engagement with the inner bearing race.

Figure 5:
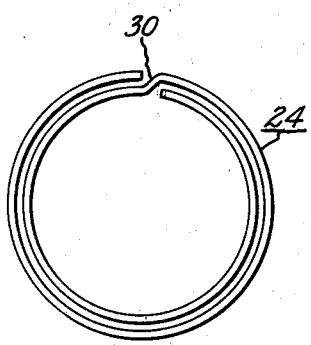
Figures 5, 6 and 7 are elevational views in reduced size of reinforcing rings which may be used in the present oil seal.
Figure 6:
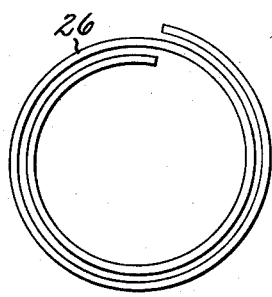
Figure 7:
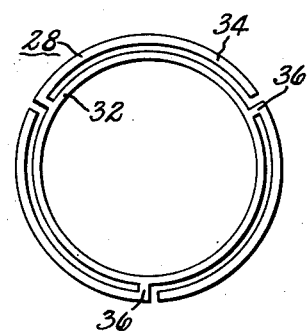

The resilient radially compressible reinforcing member 24 is shown in its preferred form in Figures 2 and 5. It consists of a planar coil spring having an offset portion 30 and having two coils whereby a uniform annulus is formed which may be readily positioned and molded in the seal body 19. The coil spring may be made of flat or round steel wire or stamped from sheet steel. The resilient member may have as many coils as desired and of any desired cross sectional dimensions which will provide the reinforced seal body with the desired degree of radial and axial flexibility. A non-uniform planar coil spring 26, as shown in Figure 6, may also be used but it has the disadvantage of being more difficult to handle and position in the process of manufacturing the seal. Various resilient or spring-like structures may be employed as a reinforcing member in the present seal which are radially compressible and which preferably have axial flexibility. A spring ring 28 as shown in Figure 7 having a flat ring portion 32 and a plurality of outwardly disposed spring fingers 34 joined to ring 32 by radial portions 36 may also be used. The outer spring member 34 provides the outer portions of the seal body which supports bead 20 with a capacity to hold bead 20 resiliently locked within groove 22 but permits the outer portions of the seal body to be readily deformed radially inwardly whereby the seal may be readily removed from the bearing. Greater radial flexibility may be achieved by splitting the ring portion 32 at a suitable point or points while retaining the unitary character of the member.

The elastomeric material of which the elastomeric portions of the seal may be made include any rubbery material or suitably compounded mixtures of rubbery materials, for example, natural rubber, silicone rubber, butadiene styrene copolymers, butadiene acrylonitrile copolymers, polychloroprene and compatible mixtures of any of the above together with other useful natural and synthetic materials such as polyamides and polytetrafluoroethylene having similar characteristics. The preferred compositions include materials which will not deteriorate or appreciably change their resiliency in the presence of heat, light and bearing lubricants.

The present seal may be readily removed from the bearing assembly without damage thereto by inserting any suitable pointed instrument, as for example, an ice pick, between the lip 23 of the groove 22 and the bead portion 20 of the seal and prying upwardly. Because of the resilient nature of the reinforcing member 24 which would be compressed radially inwardly by the pointed instrument and the radial proximity of the groove lip 23, the seal may be removed in an obvious manner. This permits the repacking of the bearing at regular intervals as required for maintaining the life of a bearing without damaging or destroying the seal thereby.

In the preferred design as shown in Figures 2 and 5, the reinforcing member 24 has both radial and axial flexibility whereby the seal is not only maintained resiliently in a proper position within the outer bearing race or other housing member, but also has inherent axial flexibility making the seal very desirable for self-aligning bearings.

In the manufacture of the seal, the reinforcing member 24 is positioned in a mold and elastomeric material is molded about it and vulcanized in a well known manner. The reinforcing member 24 as shown in Figures 2 and 5 is a practical design for mass production since the spring permits indexing or seating into position in the mold. As is obvious, the present seal in addition to novel features described above provides a unitary seal which may be readily handled and manufactured at low cost.

While the embodiments of the present invention as herein disclosed, constitute preferred forms, it is to be understood that other forms might be adopted.

What is claimed is as follows:

1. A sealing means adapted to be insertable and removable relative to a pair of substantially concentrically spaced and relatively rotatable members forming radially inner and outer confines of an annular lubricant chamber closed to prevent egress of lubricant therefrom and ingress of deleterious material thereto laterally through space wherein there is provided adjacent to at least one side of the chamber the sealing means, comprising, a substantially flat annular elastomeric member having a bead portion provided extending radially thereof for engagement centrally relative to an annular groove of one of the rotatable members and a wiping sealing-lip portion provided extending radially thereof in an opposite direction for engagement against the other of the rotatable members, said wiping sealing-lip portion being adapted to be distortable away from the chamber and laterally outwardly of the one rotatable member, and a radially planar annular metal reinforcing coil spring member fully embedded both laterally and radially within said flat annular elastomeric member, said coil spring member being both radially compressible and axially distortable relative to each of opposite inner and outer radial portions thereof, said coil spring member having one radial portion that terminates within the confines of said bead portion of said elastomeric member and that is located to one side of the center of the annular groove for reinforced resilient support of said bead portion with a capacity to hold said bead portion resiliently locked within the groove while permitting both the opposite radial portion of said coil spring reinforcing member and said wiping sealing lip portion to be both radially and laterally flexible to compensate for any radial and lateral misalignment between said rotatable members relative to said sealing means.

2. In a bearing having an inner ring and an outer ring disposed one within the other in substantially uniformly spaced relationship, the outer of said rings having an annular groove with laterally spaced edges integrally formed on a radially inner side thereof relative to the other ring, means for sealing space between said rings laterally to one side thereof, comprising, a substantially flat annular elastomeric member having a substantially radially extending central body, a bead portion provided radially away from and radially integrally formed with the central body of said elastomeric member, a wiping sealing lip portion provided radially integrally formed with the central body of said elastomeric member and extending radially away from said bead portion, said wiping sealing-lip portion being adapted to be distortable laterally relative to the space being sealed, and a radially planar annular metal reinforcing spring member embedded within said elastomeric member, said spring member having one radial portion that terminates within the confines of said bead portion of said elastomeric member and that is located to one side of the center of the annular groove for reinforced resilient support of said bead portion with a capacity to hold said bead portion resiliently locked within the groove, said spring member having an opposite radial portion that terminates adjacent to said sealing-lip portion, said spring member being both radially and laterally flexible into and out of radial planar relationship to compensate for any radial and lateral misalignment between said rotatable members relative to said sealing means.

3. Means for sealing as claimed in claim 2 wherein said reinforcing spring member is a coil spring having progressively spaced convolutes lying substantially in a radial plane and having both lateral resilience for counteracting axial distortion and radial resilience for counteracting radial compression of both said elastomeric member and said reinforcing spring member.

4. Means for sealing as claimed in claim 2 wherein said reinforcing spring member comprises at least a pair of flat spring portions lying in substantially one plane and joined to each other by at least one radial portion extending in the same plane, said flat spring portions including at least one radially outwardly disposed spring finger which is included as part of said radial portion that terminates within the confines of said bead portion of said elastomeric member at an off-center location relative to said bead portion.

5. Means for sealing as claimed in claim 2 wherein said reinforcing spring member includes a ring lying in one plane and having spaced circumferentially disposed spring portions integrally joined thereto through at least one radial portion, said spring portions and said radial portion lying in the same plane as said ring which is split at at least one point where said radial portion joins said circumferentially disposed spring portions.

References Cited in the file of this patent

UNITED STATES PATENTS

| | | |
|---|---|---|
| 2,330,104 | Antonelli | Sept. 21, 1943 |
| 2,467,049 | Peterson | Apr. 12, 1949 |
| 2,764,433 | Cobb | Sept. 25, 1956 |

FOREIGN PATENTS

| | | |
|---|---|---|
| 156,499 | Australia | May 14, 1954 |